United States Patent [19]

Piepho

[11] Patent Number: 5,149,423
[45] Date of Patent: Sep. 22, 1992

[54] APPARATUS FOR THE PURIFICATION OF WASTE WATER WITH SWIVELLING MIXING CONTAINER

[76] Inventor: Ralf F. Piepho, August-Warnecke-Weg 22, D-3015 Wennigsen, Fed. Rep. of Germany

[21] Appl. No.: 715,111

[22] Filed: Jun. 12, 1991

[30] Foreign Application Priority Data

Jun. 23, 1990 [EP] European Pat. Off. ........... 90111970

[51] Int. Cl.⁵ .................... B01D 33/048; B01F 11/00
[52] U.S. Cl. ..................... 210/148; 210/205; 210/219; 210/248; 210/400; 366/237; 366/238; 366/601
[58] Field of Search ............... 210/143, 148, 232, 262, 210/400, 206, 208, 145, 205, 219, 248, 401; 422/209, 210, 270; 366/220, 186, 187, 237, 238, 239, 601

[56] References Cited

U.S. PATENT DOCUMENTS

| | | | |
|---|---|---|---|
| 3,156,536 | 11/1964 | Desbois | 422/209 |
| 4,308,139 | 12/1981 | Piepho | 210/400 |
| 4,865,724 | 9/1989 | Brandt et al. | 210/401 |

FOREIGN PATENT DOCUMENTS 67959 12/1982 European Pat. Off. ............ 210/400

Primary Examiner—Robert A. Dawson
Assistant Examiner—Joseph Drodge
Attorney, Agent, or Firm—Allegretti & Witcoff, Ltd.

[57] ABSTRACT

An apparatus for purifying waste water by precipitating out foreign material as solids and separating the solids from the purified water comprising a rotatable semi-cylindrical open container and a band filter beneath the container for receiving the contents of the container and separating the precipitated solids from the purified water. As the container slowly rotates, the contents spill over the edge of the container onto the moving band filter. The purified water is recovered in a filtrate container beneath the filter while the solids are discharged to waste from the end of the band filter. A microprocessor controls the sequence of operations, including the rotation of the container, the stirring mechanism, the feeding of the precipitation agent and the duration of stirring.

7 Claims, 5 Drawing Sheets

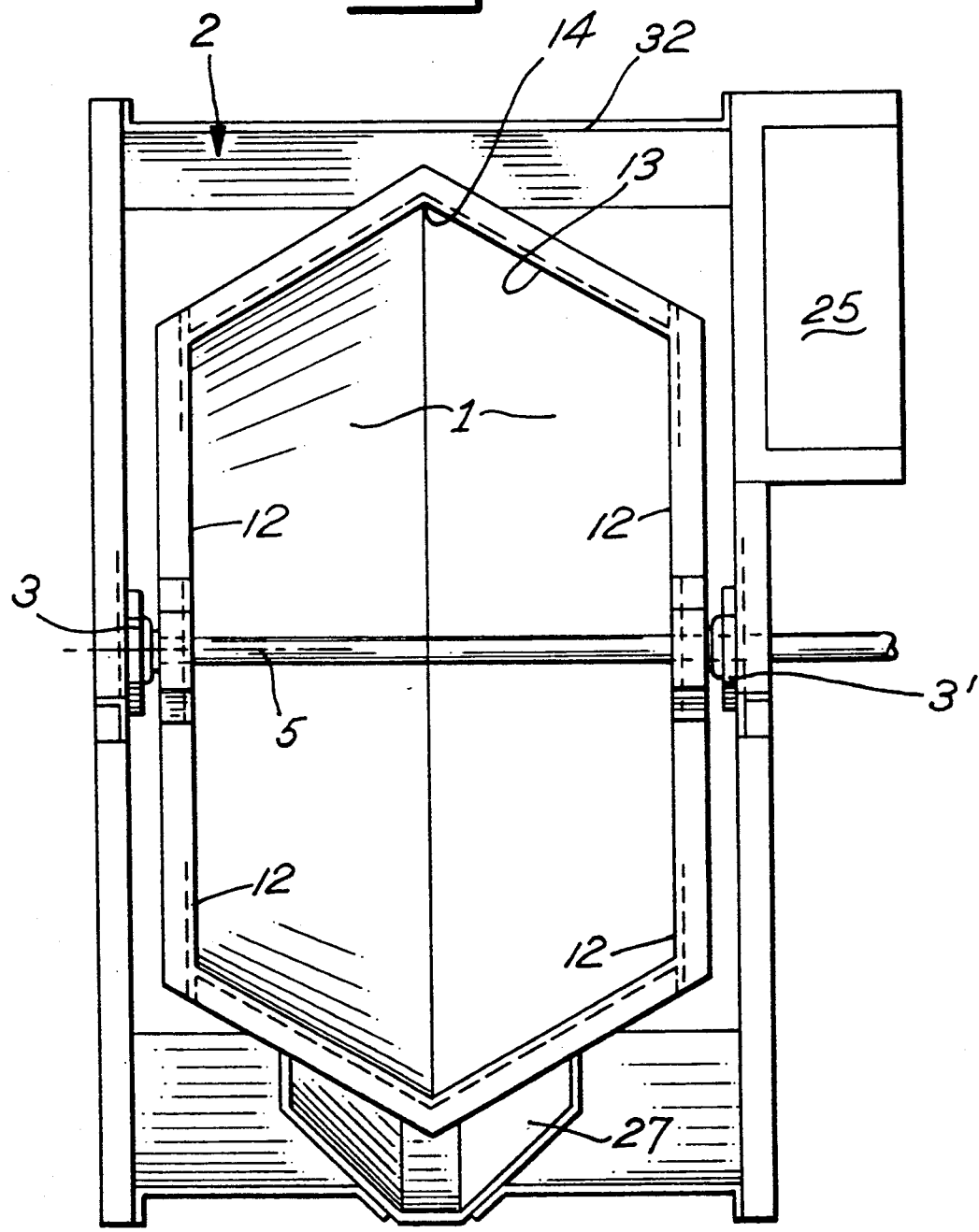

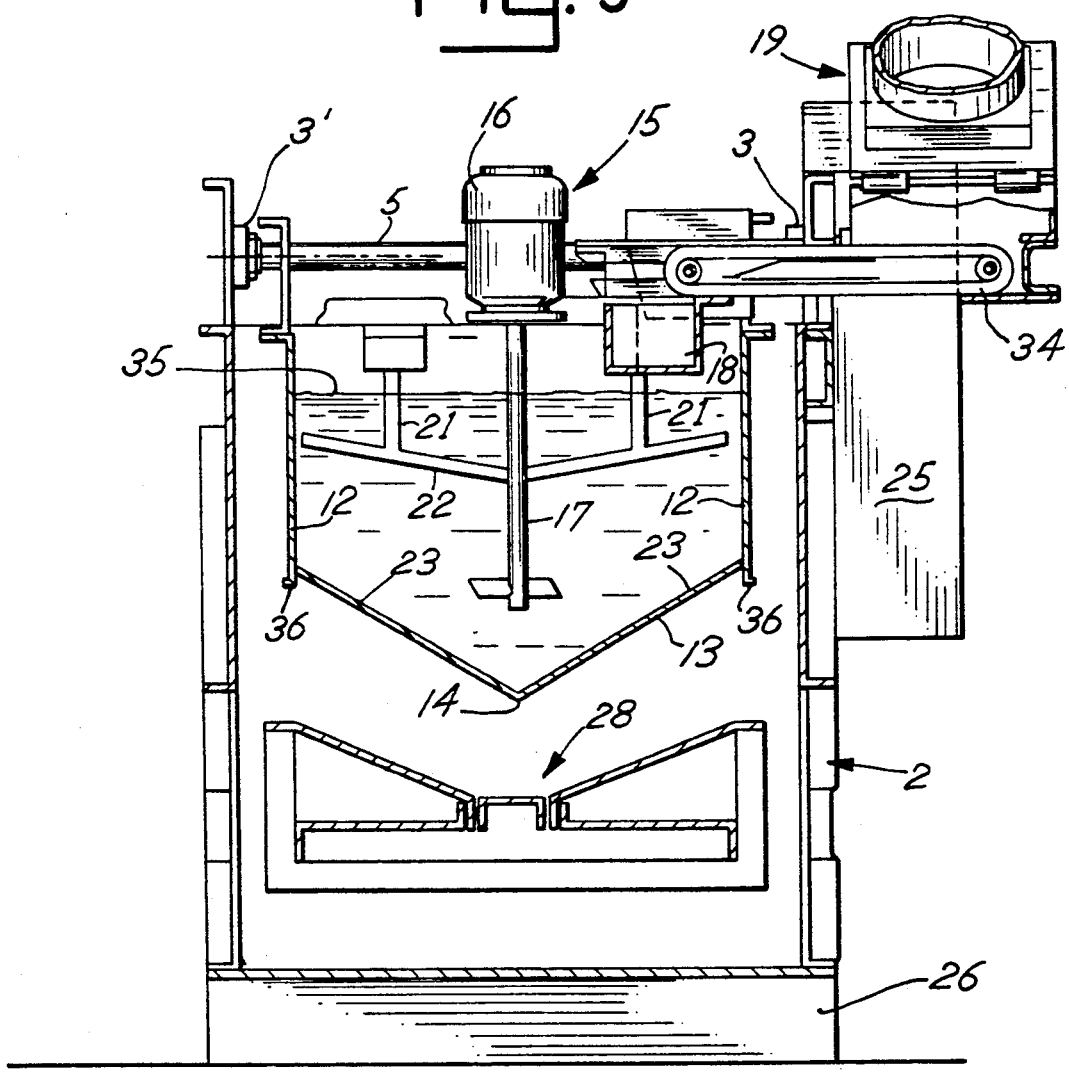

APPARATUS FOR THE PURIFICATION OF WASTE WATER WITH SWIVELLING MIXING CONTAINER

BACKGROUND OF THE INVENTION

The invention relates to a transportable device for the purification of waste waters of every type, used emulsions and the like, in which the waste water is placed in a container, mixed with a chemical substance to precipitate out the foreign material and separated from the precipitate by means of a band filter.

THE PRIOR ART

Devices of this type are already known as disclosed in DE-PS 31 24 738. In that document, reaction containers are provided which are positioned laterally from a settling tank, from which the fluid is discharged onto a band filter positioned below the containers. The sediment, which collects within the lower portion of the settling tank, is discharged by means of an endless band containing pockets, and slides over a sloping surface onto the band filter.

The band filter bears on its upper reach a tape shaped, non-woven fiber material which separates the filtrate from the solid materials in the waste water.

This device, although it is extraordinarily effective in its operation, does have the disadvantage when smaller quantities of waste waters are to be purified with organic substances and compounds emulsified therein, that it is expensive and requires too much space. It requires multiple devices for the handling of the sediment, for the filtration of the waste water after the introduction of the separating agent, for the removal of the waste water from the reaction container into the settling tank and for the provision of valves and tubes for carrying the waste water, etc. The device is also relatively maintenance-intensive.

SUMMARY OF THE INVENTION

The object of the present invention is to provide an apparatus of the type described which requires less space, is highly efficient, less expensive in maintenance and is variable and adaptable in its purification capacity.

These objectives are accomplished by providing a single, open-topped container rotatable about an axis which serves as both the reaction container and the sedimentation container and from which its contents are decanted directly onto the band filter which is positioned thereunder.

The container is preferably semi-cylindrical with semi-circular end walls and a semi-cylindrical base, said container being fixed to a rotatable shaft on the axis of the semi-cylinder. The shaft is rotated by means of a motor and gear box. The semi-cylindrical bottom of the semi-cylindrical container is preferably V-shaped in cross section, the apex of the V running at right angles to the axis of the semi-cylinder.

The container may have a shape other than a semi-cylindrical one, such as, for example, trapezoidal or triangular or rectangular, with external walls which slope equally on both sides to a cylindrically curved base, or the like.

The V-shaped construction of the base provides a discharge spout which, upon the swivelling or rotating of the container, guides the contents onto the center of the band filter which is positioned beneath the container.

The semi-cylindrical container is supported within a correspondingly-shaped frame. The upper edges of the container, which coincide with the diameter of the semi-cylinder, are supported in a horizontal position. In this position, a stirring mechanism and the feed tube for charging the precipitating agent, fed by a dosing device, projects into the internal space of the container.

The stirring mechanism, which consists of a drive motor and a propeller on the end of a shaft, is positioned on a transverse support or shelf above and to one side of, the axis of the semi-cylindrical container. The space above the container on the other side of the axis is open, so that when the container is rotated to spill out its contents, the stirring mechanism and the feed tube for charging the precipitating agent into the container and the other operating parts therefor are not disturbed.

The band filter essentially corresponds to the band filter of known construction. It consists of a continuous or endless belt trained around a roller at each end which drive and guide the belt. The belt may comprise vertically-arranged articulated metal receptacles mounted in spaced relation on transverse rods, or simply wire mesh. The belt is open to permit liquid to flow therethrough. The belt carries a layer of non-woven fiber material which functions as a filter. The fiber material is continuously drawn off a supply roller on one side of the machine and discharged at the opposite side. The stirring mechanism with the propeller and the drive motor is also of known construction, as is the dosing device for the chemical precipitating agent. Furthermore, in accordance with the invention, a stationary rubberlipped wiper projects radially into the semi-cylindrical container and scrapes the V-shaped bottom of the container as the container rotates. The wiper is supported in an adjustable and elastic manner. The swivelling of the container preferably takes place over such an angular area that the wiper wipes the entire bottom surface to completely empty the container.

The movements of both the band filter, as well as the swivelling movement of the container, proceed very slowly, either intermittently or continuously, and are coordinated in time with the stirring mechanism, with the feeding of the precipitating agent, with the duration of stirring, and with the sedimentation. These actions and their sequences are controlled either electrically or electronically using a microprocessor.

During the mixing of the waste water which is conducted in a suitable manner through pipes, the container is preferably stationary. After a certain time span, the stirring mechanism is shut off and a residence time elapses during which precipitates and sediments can form. The rotating or swivelling of the container then begins, and the entire contents are decanted through the V-shaped channel in the container bottom. The rotating phase of the container begins during both the mixing of the separating agent and the reaction phase for the formation of the precipitate. Alternatively, the rotation may begin after the mixing phase and after the beginning of the sedimentation phase, or even if the sedimentation phase has terminated.

It is now easy to recognize that the combination of all elements of the purification of the waste water are within one container. The elimination of tube pipings, valves and the like, yields an extraordinarily versatile device which is simple to maintain. Because the container rotates slowly, either intermittently or continuously, and the precipitation essentially completed, there results an advantageous separate release of the purified fluid and of the precipitate or sediment. The water which stands above the precipitate is substantially free of flocculations and is decanted onto the band filter which may remain stationary. As the container continues to turn, fluid with more flocculations is discharged. Finally, when the container has reached its final position of rotation, the sediment then spills out with the aid, if necessary, of the wiper. The sediment, or precipitate, settles on the band filter through which the water, which is practically pure, flows to a filtrate container. The band filter is therefore also used economically, and the sediment efficiently settles on the non-woven fiber material of the band filter.

The water flowing through the band filter is collected in a filtrate container positioned underneath the filter and is diverted in the known manner. For guiding the water which is decanted off from the container and onto the band filter, a trough is provided at the discharge end of the container which diverts the water onto the surface of the band filter. The machine framework which supports the container in a swivellable manner is, in the area of the container, preferably provided with closed walls. The drive motor for the propeller of the stirring mechanism is positioned above the discharge end of the container. The drive motor for rotating the container and the dosing device also are positioned laterally outside the space into which the container rotates. The tube for feeding waste water into the container is mounted next to the distributor of the dosing device for the precipitating agent.

Because of its open, exposed construction, the container can also be changed, repaired, or otherwise maintained very easily, if this should be necessary.

THE DRAWINGS

The invention will now be illustrated in greater detail by means of one example of execution, which is depicted in the drawings in which:

FIG. 4 is a plan view of the container showing its mounting on the frame; and

FIG. 5 is a cross-section through the machine.

DESCRIPTION OF PREFERRED EMBODIMENT

Figure 1:
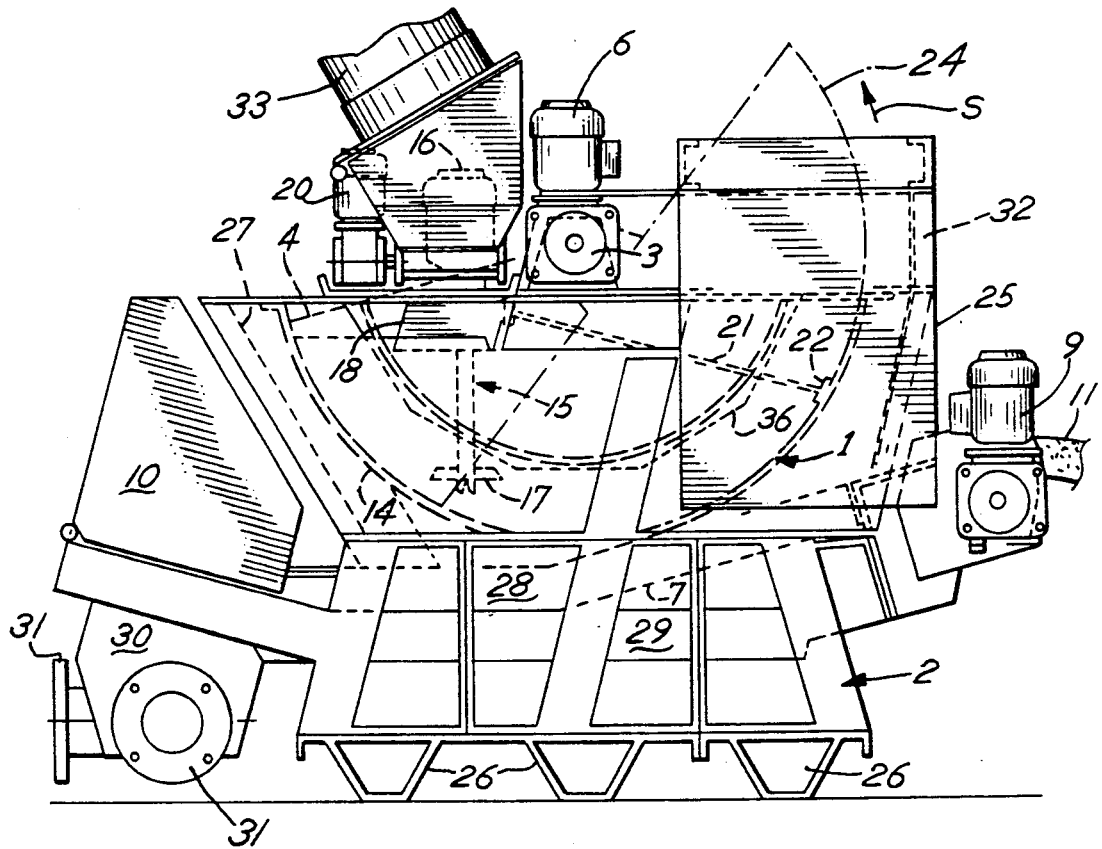
FIG. 1 is a schematic side elevational view of the device constructed in accordance with the invention.
Figure 2:
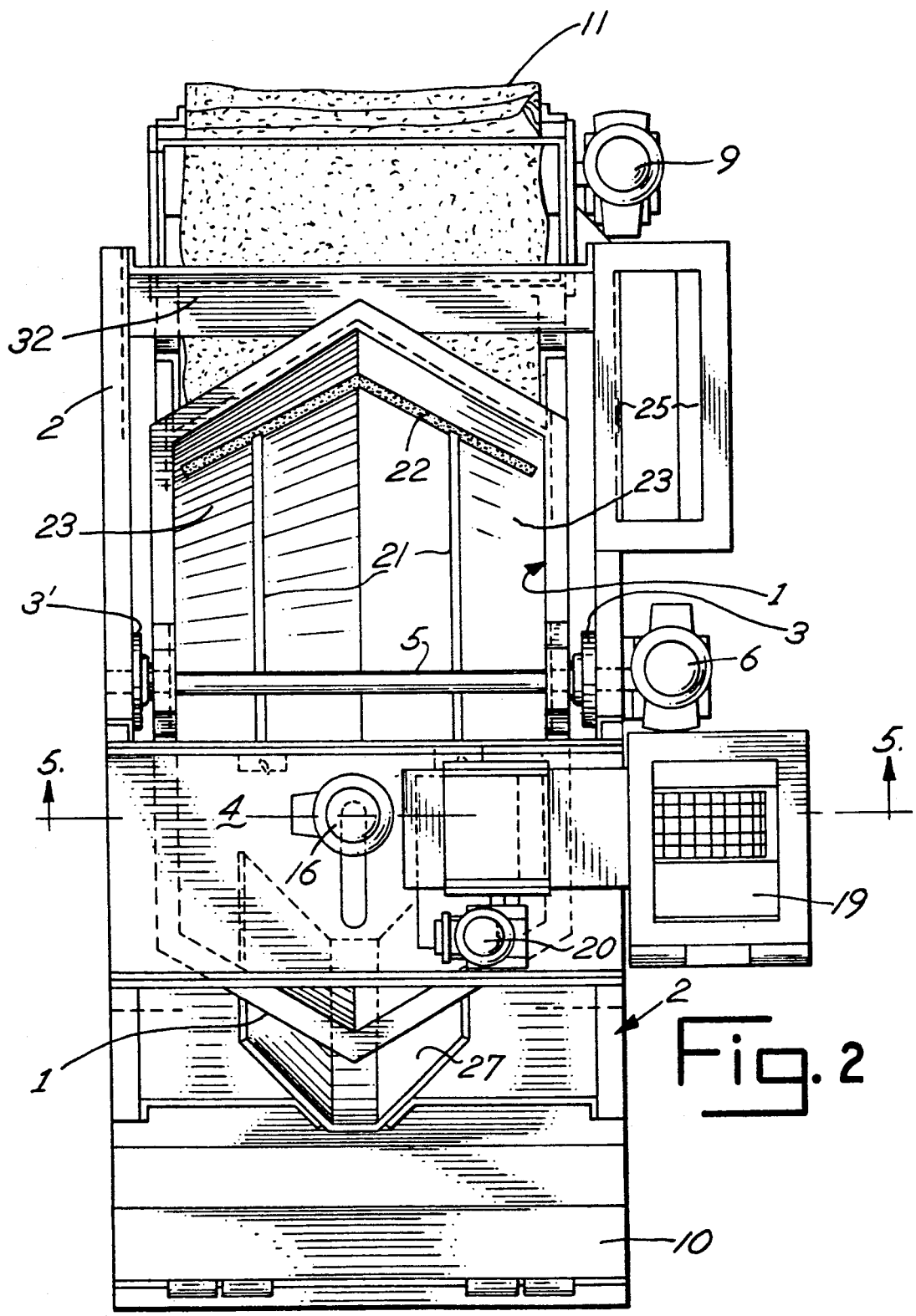
FIG. 2 is a plan view of the device shown in FIG. 1.
Figure 3:
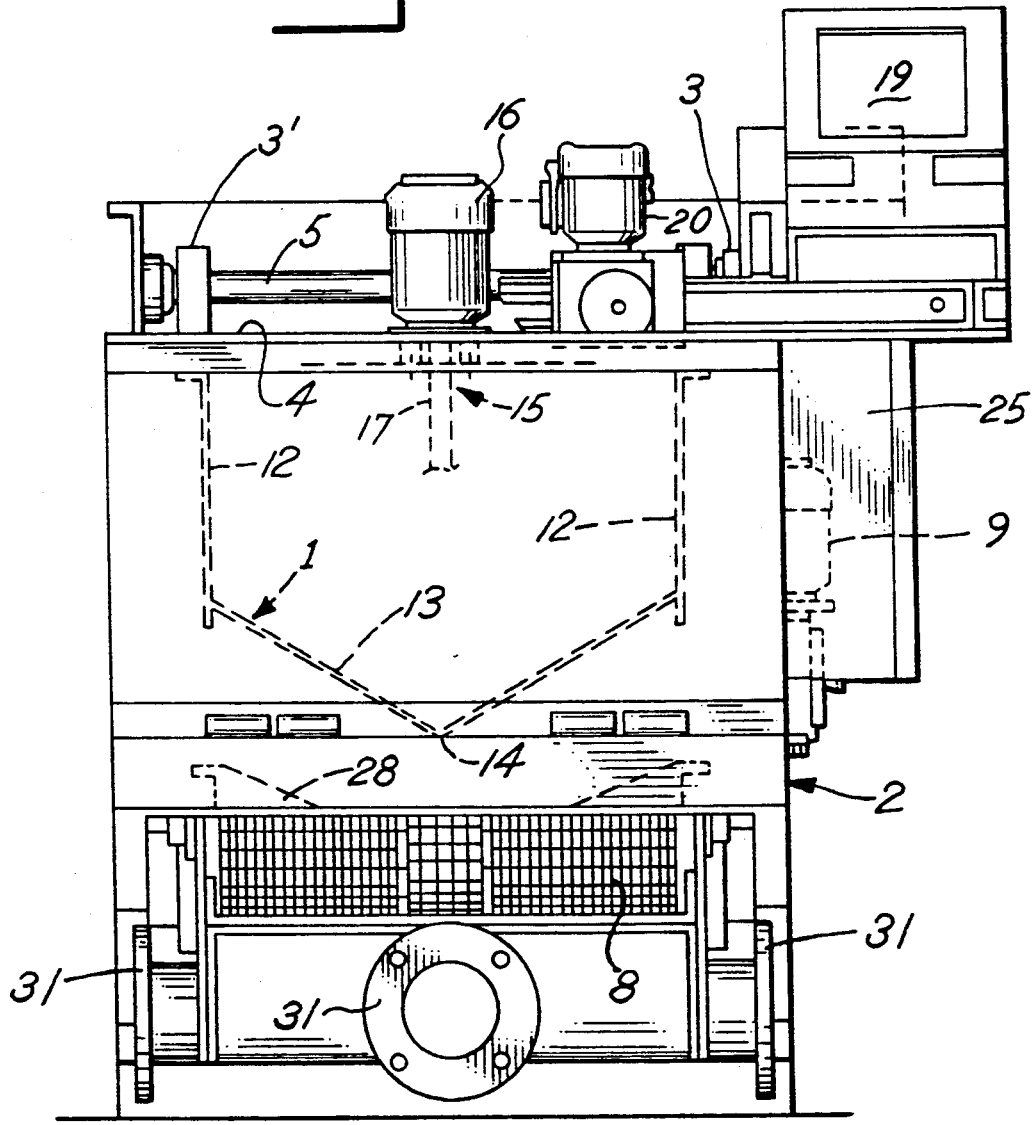
FIG. 3 is an elevational view of the left side of the device as viewed form FIG. 1.

As can be seen from the drawing, particularly from FIGS. 1 to 3, the container 1 is supported in a rotatable manner within a box-shaped, essentially rectangular, machine frame 2, approximately in the middle of the box. The container is fixed to shaft 5 mounted at its ends in bearings 3, 3' on the frame side walls. The shaft is rotated or swivelled by means of a regulatable motor 6.

The machine frame 2 is a box, which is more or less closed on its ends, additionally serves to support a band filter 28, which in FIG. 1, extends from left to right and is indicated by the broken line 7. In FIG. 3, which depicts a view of the device from the left side, the porous metal band 8 supporting the non-woven fiber material, which is a part of the band filter, is visible and specifically so at the point where it is trained around the roller. The band of known construction is essentially an endless belt made of metal which supports the fiber batt and permits the liquid to flow through, for example, wire mesh. The band 8 is advanced by means of a controllable motor 9 which drives a cam roller around which the porous band rotates on the drive side. Otherwise, the porous band in the conventional manner is guided by means of guide rollers not shown. A supply roll of non-woven fiber batt material is mounted in the container 10 and unrolls as the porous band advances under the container 1. The fiber and the solid material it carries is released at the drive end, as indicated at 11 in FIG. 1.

The container 1 is semi-cylindrical in form, has semi-circular end walls 12 and a V-shaped bottom 13 which is semi-cylindrically bent, the apex 14 of which is located on the center line between the two end walls.

Above the container there is positioned on one side of the rotatable shaft 5 a stirring mechanism 15 consisting of an electrical motor 16, a shaft with a propeller 17, as well as a feed conduit 18 of a dosing device 19, by means of which the precipitating agent is dosed into the fluid. The reference FIG. 20 designates the drive motor for the dosing device 19. The space on the other side of shaft 5 is open so the container can be tilted to the position indicated at 24, FIG. 1.

A transverse support 4 which extends over the container and is mounted on the machine frame 2 supports the stirring mechanism 15, a wiper 21, the wiping lip 22 which adjustably contacts the internal surface of the V-shaped bottom 13 of the container 1 in order to wipe off the precipitated solids adhering to the same, as the container rotates. The forward edge of the part 22 is provided with a rubber lip which bears against the internal surface 23 of the bottom 13 of the container 1. The container rotates in the direction of the arrow S, and one position during rotation is indicated in broken lines 24 in FIG. 1. The rectangle 25 is a box which contains the electrical-electronic switching and control equipment for the operation of the device. The machine frame 2 stands on the supports 26 and inside the frame, as is evident from FIGS. 1 and 2, there is provided on the discharge side of the container 1, an inclined trough 27 which guides the water flowing out from the container onto the band filter 28. The sediment remains on the filter while the clean water flows through the filter into a filtrate container 29 beneath the filter. Water from container 29 is discharged by means of a distributor 30 with tube connections 31. The end opposite the discharge side of the container 1 is closed by means of a wall 32, as shown in FIG. 2.

The supports for the motors, the mounting support for the band filter and the construction of the non-woven fiber supply container 10 which feeds the fiber onto the endless porous belt follow conventional machine construction rules and techniques which also applies to the machine frame 2 and the construction of the rotatable container 1.

The introduction of the waste water which is brought into the container 1 for purification is not depicted in the drawings, since this introduction is determined in accordance with local conditions. A supply line can, however, be provided through the transverse support 4 extending into the internal space of the container 1.

PRACTICAL OPERATION

The manner of operation of the device in accordance with the invention is as follows:

The device occupies, at the beginning of its operation, the position shown in FIG. 1. This representation is indicated by means of the broken line 7.

In this position in which the upper edge of the container 1 is horizontal, a certain quantity of the fluid which is to be purified is brought into the container. This quantity is determined by the holding capacity of the container 1 which can vary in accordance with the size of the device. A prescribed quantity of precipitating agent is fed into the container from a conveyor belt 34 driven by motor 20, through conduit 18, as best shown in FIG. 5. The liquid level is indicated at 35 in FIG. 5.

The motor 16 of the stirring mechanism 15 is then actuated to start the propeller 17. A thorough mixing of the precipitating agent with the fluid or the waste water which is to be purified is carried out for a specific period of time, whereupon the motor 16 is shut off.

There follows a phase for a specific, selectable period of time during which a chemical-physical reaction occurs in which the noxious materials in the fluid react with the precipitating agent to produce a flocculate which begins to settle out. At the end of the residence time for the formation of the flocculate and the settling, the container 1 is slowly rotated through the power of the motor 6 in the direction of the arrow S. The shaft 5, which is journaled in the bearings 3 and 3' of the machine frame 2 and to which the container 1 is fixed, is rotated by means of the motor 6.

By means of this slowly rotating movement, the container half beneath the transverse support 4 moves away from the stirring mechanism 15 and the feed conduit 18 of the dosing device 19 to the position shown in broken lines 24 in FIG. 1. The fluid begins at a specific point in time to spill out over the V-shaped edge of the container to decant the clear fluid and finally the entire container is emptied. The wiper lip 22 then slides along on the internal surface 23 of the bottom 13 and frees it from adhering sediment.

The water which flows out or is decanted during the rotating movement of the container 1 flows along the inside of the trough 27 onto the band filter 28 and finally into the filtrate container 29. The sediment, as well as the solids which are still suspended within the fluid, are held back on the non-woven fiber material and discharged along with the nonwoven fiber material at 11, FIG. 1. After the complete emptying of the container 1, it is rotated back into its starting position by reversing the motor and the process is repeated.

The swinging of the container 1 back into its starting position is preferably carried out much more rapidly than the rotating movement during the emptying of the container. It should be noted, finally, that the polygonal/circular line 36 (FIG. 5) represents the edges of the side walls 12 which, for reasons of economy of construction, is not cut out in a circular shape, but is rather rectilinear.

I claim:

1. Apparatus arranged for purifying waste water by precipitating out foreign material therein and separating at purified water from the precipitate comprising:
    a pair of side frames;
    a shaft extending between said side frames;
    a semi-cylindrical container mounted for swivelling rotation on said shaft;
    said container having spaced semi-circular side walls at opposed ends of said shaft, and a bottom wall extending between said side walls, said bottom wall terminating in a spill-over edge to one side of said shaft;
    a band filter means disposed beneath the container for receiving contents of the container which spill over said edge as the container is rotated in a direction lowering said edge said content containing water and precipitate,
    means for advancing the band filter to carry away said precipitate; and
    means beneath said band filter for receiving purified water which flows through the band filter.

2. The apparatus of claim 1 which includes a trough mounted between said spill-over edge and said band filter for directing said contents onto said band filter.

3. The apparatus of claim 1 which includes a motor and control mechanism means for controlling said container rotation and driving said rotation either continuously or intermittently.

4. The apparatus of claim 1 in which said bottom is V-shaped, the apex of which is located on a line running transversely of the container axis between said end walls.

5. The apparatus of claim 4 which includes a wiper mounted against the interior surface of said V-shaped bottom inside said container for scraping precipitate from said surface.

6. The apparatus of claim 1 which includes a transverse support means mounted on said side frames and extending above the top of said container between said shaft and said spill-over edge, a stirrer mounted on said support means and extending down into said container, whereby said container can be rotated without interference from said stirrer.

7. The apparatus of claim 1 in which said band filter comprises a porous conveyor belt and includes means mounted adjacent said belt for applying non-woven fabric filter material to said belt as the belt advances.

* * * * *